Figure 1:
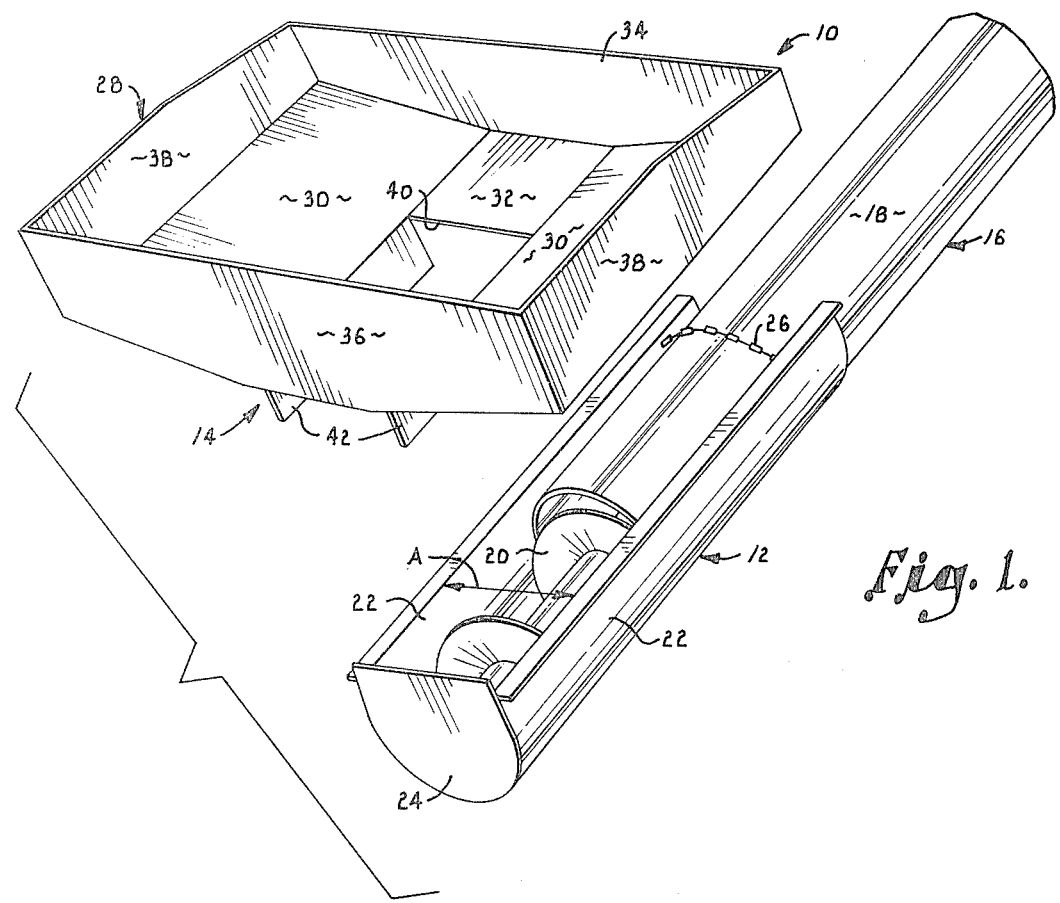

United States Patent [19]

Letzig

[11] 4,220,434
[45] Sep. 2, 1980

[54] HOPPER FOR GRAIN AUGERS

[76] Inventor: Otto R. Letzig, R.R. 4, Richmond, Mo. 64085

[21] Appl. No.: 50,663

[22] Filed: Jun. 21, 1979

[51] Int. Cl.³ .......................... B65G 3/00; B65G 1/00
[52] U.S. Cl. ................................... 414/326; 222/413; 198/671
[58] Field of Search ............... 414/326; 198/860, 671; 222/413, 412, 410, 411

[56] References Cited

U.S. PATENT DOCUMENTS

| | | | |
|---|---|---|---|
| 2,932,712 | 4/1960 | Levin | 222/413 |
| 3,231,071 | 1/1966 | Prentice | 198/671 |
| 3,784,065 | 1/1974 | Patfoort | 222/413 |
| 4,036,411 | 7/1977 | Westhoff | 222/413 |

Primary Examiner—Robert G. Sheridan
Assistant Examiner—Lawrence E. Williams
Attorney, Agent, or Firm—Lowe, Kokjer, Kircher, Wharton & Bowman

[57] ABSTRACT

A hopper for use with grain elevators is the subject of the present invention. Two components are separable but are held together by a friction coupling. The first component comprises a trough which partially encloses the auger and receives the second component which presents a hopper for receiving grain. The holding area of the hopper empties into an opening which is in alignment with the open area of the auger for feeding grain to the latter. A pair of side flaps extend from the holding area down into the trough to present a coupling to hold the two components together.

4 Claims, 2 Drawing Figures

U.S. Patent

Sep. 2, 1980

4,220,434

HOPPER FOR GRAIN AUGERS

This invention relates generally to grain handling equipment, and more particularly, to a hopper for use in conjunction with grain handling augers.

Nearly all modern farms employ power operated augers for moving grain from an unloading area to a storage bin. Augers vary in size, but are generally no more than twelve inches in diameter and usually are much smaller. Grain is unloaded from trucks or trailers having dump beds and some type of confinement is required to catch the grain before the auger moves it to the desired location. Various types of makeshift devices have been utilized to form a holding area to catch the unloaded grain and feed it to the auger. Typically, old tractor tires, feeder tanks, or simply pieces of metal siding have been employed.

The problem encountered is that a relatively large area is needed to catch the grain being unloaded from the dump bed although this leads to a certain inherent amount of waste of grain. First of all, the open auger will have a tendency to throw grain out of the holding area particularly when the level of grain is reduced so that only a portion of the auger is covered. Second, that portion of the grain which is away from the immediate area of the auger will not be picked up and must either be manually fed into the auger or simply allowed to waste.

It is therefore, a primary object of the present invention to provide a hopper for use with a grain auger which presents a relatively large area for receiving grain from a dump bed and then funnels the grain into a confined area where it is picked up by the auger.

Another important aim of the invention is to provide a hopper for use with a grain auger which reduces waste by confining the exposed auger so as to minimize throwing of grain by the auger.

An important aim of my invention is to provide a hopper for use with the grain auger which eliminates the waste of grain left in a large holding area by locating the holding area above the auger and funneling the grain into a confined area around the auger.

As a corollary to the above object, one of the aims of the invention is to eliminate the need to hand feed any grain which is left in a large holding area by providing for complete emptying of the holding area into a more confined area for pick up by the auger.

A further object of the invention is to provide a hopper particularly designed for use with grain augers which is constructed in two separable components for ease in installation and removal.

Figure 2:
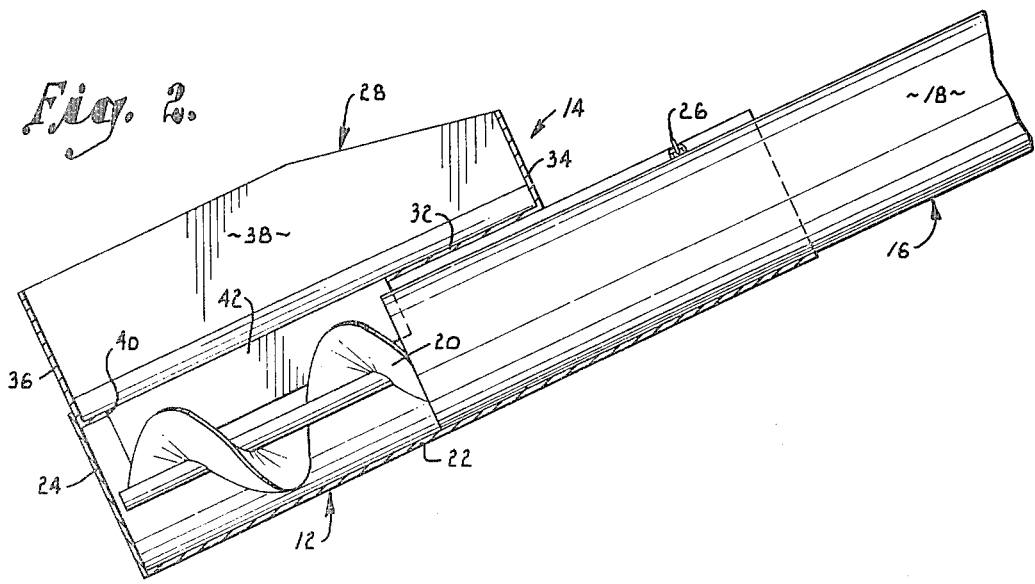

Other objects of the invention will be made clear or become apparent from the following description and claims when read in light of the accompanying drawing, wherein:

FIG. 1 is an exploded perspective view of the hopper according to the present invention; and FIG. 2 is a vertical cross-sectional view of the hopper of FIG. 1.

The hopper construction of the present invention is designated generally by the numeral 10 and comprises first and second separable components designated by the numerals 12 and 14 respectively. Hopper 10 is especially designed for use with a grain auger designated generally by the numeral 16. Auger 16 comprises a generally cylindrical open ended housing 18 inside of which is located a screw 20. The screw is driven by a drive train and motor well known to those skilled in the art, but which have been omitted from the drawings in the interest of brevity and clarity. One end of screw 20 projects from housing 18 a distance of one to two feet so that grain may be received and moved upwardly as a result of rotation of the spiral flights of the screw.

The first component 12 of the device 10 of the present invention comprises an open trough having a generally u-shaped wall 22 which encloses auger 16 over approximately ½ to ¾ of the auger's circumference. The cross-sectional dimension of the trough presented by wall 22 is represented by the letter A. This dimension is equal to the diameter of screw 20 plus only enough distance to allow for operation of the screw. Thus, the distance A is approximately equal to the overall diameter of auger 16. An end plate 24 encloses one end of the trough while the opposite end is open for receiving the auger. A chain 26 spans the distance between the two legs of wall 22 and is removably secured thereto so as to hold trough 12 in rigid relationship relative to auger 16. Two depending legs 27 are rigid with wall 22 and cooperate with a horizontal bar 29 to form a stabilizing framework for contact with the ground.

The second separable component 14 of the device 10 comprises a hopper box 28 presented by inclined bottom sections 30 separated by an intermediate bottom section 32. Box 28 is completed by sidewalls 34 and 36 and end walls 38 which are rigid therewith. It is to be noted that the three bottom sections 30 and 32 present an opening 40. Opening 40 is of a length corresponding approximately to the length of the exposed section of screw 20.

Finally, component 14 includes downwardly extending side flaps 42 which are rigid with bottom sections 30 and extend the length of opening 40 on either side of the latter.

In use, auger 16 is placed at a location to receive grain from a dump bed and is disposed at the desired angle for moving the grain to a storage bin. One end of chain 26 is loosened so that auger 16 may be nested in trough 12 in the manner illustrated. It is to be noted that the cross-sectional dimension of the trough as represented by the letter A, is approximately equal to the overall diameter of the auger so that once the latter is in place there is little or no movement of the auger relative to the trough. Chain 26 is secured so as to hold the auger in place. It is important to note that hopper component 14 is completely separable from trough component 12 thereby facilitating placement of the auger 16 in the trough. Once the auger is in place hopper component 14 may be seated on the trough by inserting side flaps 42 into the area of the trough which surrounds the exposed end of screw conveyor 20. Side flaps 42 thus function as a friction coupling between trough component 12 and hopper component 14. Side flaps 42 also prevent grain from being thrown up underneath bottom sections 30.

Box 28 presents a relatively large holding area for receiving grain from a dump bed. Grain is fed toward opening 40 by inclined bottom sections 30. The grain passes through opening 40 and into trough 12 where it is picked up and moved by screw 20. Since trough 12 is of approximately the same size as the screw 20 virtually all of the grain which is emptied into the trough will be picked up and moved by the screw. This eliminates waste and also eliminates the need to manually shovel any residual material into the auger. Also, since the exposed portion of screw 20 is surrounded over approximately ½ to ¾ of its diameter the problem of grain being trown by the auger, particularly when the rate of flow is less than full capacity of the screw, is greatly reduced. Meanwhile, the relatively large holding area presented by box 28 is adequate to catch and hold the flow of grain emanating from a dump bed. Since the holding area is located above the auger and is designed to funnel grain toward the auger all of the grain received is eventually fed to the auger without the need for manual shoveling.

Thus, the present invention as heretofore described accomplishes all of the objectives as herein set forth in an efficient and economical manner. It will be appreciated that the dimensions of the device may be varied to accommodate different size augers without departing from the scope of the present invention.

I claim:

1. A hopper for use with a grain auger comprising:
   trough means partially enclosing said auger, said trough means presenting an opening for receiving said auger and having a cross-sectional dimension equal to the diameter of said auger plus sufficient clearance to accomodate turning of the auger therein;
   means for defining a holding area for a quantity of grain, said holding area being disposed above said auger;
   means for presenting an opening in said holding area of a width corresponding to the width of said trough opening; and
   opposed side flaps extending downwardly from said holding area defining means into said trough means and on either side of said auger for coupling said holding area defining means with said trough means.

2. The invention of claim 1, wherein said trough means comprises a first separable component and said holding area defining means together with said coupling means comprises a second separable component.

3. The invention of claim 2, wherein is included support means coupled with said trough means for holding the latter at an angle corresponding to the angle of disposition of said auger.

4. A hopper for use with a grain auger comprising:
   a first separable component comprising: trough means partially enclosing said auger, said trough means presenting an elongated opening for receiving an auger; and
   a second separable component comprising: (a) means for defining a holding area for a quantity of grains disposed above said grain auger, (b) means presenting an opening in said holding area of a width corresponding to the width of said trough opening, and (c) means for coupling said holding area defining means with said trough means, said coupling means consisting only of opposed side flaps extending downwardly from said holding area defining means into said trough means and on either side of said auger.

* * * * *